Feb. 15, 1927.  J. W. STUDEBAKER  1,617,657

EDUCATIONAL DEVICE

Filed May 10, 1926

Witness
L. F. Sandberg

Inventor
John W. Studebaker
by Bair & Freeman Attorneys

Patented Feb. 15, 1927.

1,617,657

UNITED STATES PATENT OFFICE.

JOHN W. STUDEBAKER, OF DES MOINES, IOWA.

EDUCATIONAL DEVICE.

Application filed May 10, 1926. Serial No. 107,953.

The object of my invention is to provide an educational device, particularly adapted for exercises of various kinds, wherein it is desirable to test the result of the exercises carried out.

More particularly, it is my object to provide such a device, comprising a card having a series of holes therein, said card having on one side incomplete subject matter adjacent to the respective holes and on the other side, matters serving to complete the subject matter on the first die, and arranged adjacent to certain holes, the card having on the latter described side further incomplete subject matter, and on the first described side, matter serving to complete such last mentioned incomplete matter, so that there is thus provided a device using only half as many cards as are ordinarily employed in educational appliances of this kind.

A further purpose is to provide such an appliance, which can by various slight changes be used for a great variety of exercises and tests.

With these and other objects in view, my invention consists in the construction, arrangement and combination of the various parts of my educational device, whereby the objects contemplated are attained, as hereinafter more fully set forth, pointed out in my claims, and illustrated in the accompanying drawings, in which:

Figure 1:
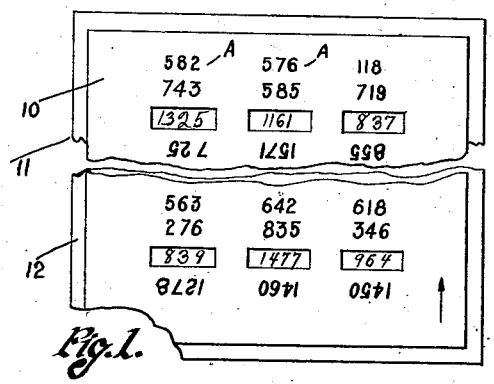
Figure 1 is a plan view of one side of a device embodying my invention, parts being broken away.
Figure 2:
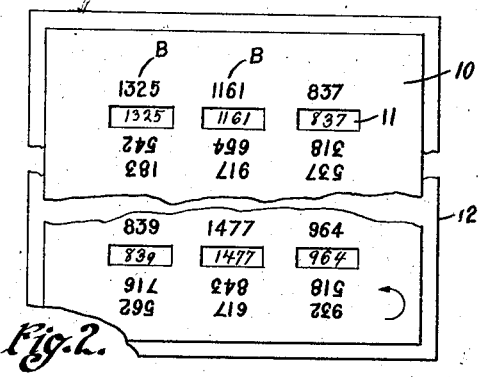
Figure 2 is a similar view of the reverse side of the same sheet, parts being broken away.

I will first describe the embodiment of my invention as disclosed in Figures 1 and 2.

In Figure 1, I have used the reference numeral 10 to indicate generally a card having a series of regularly arranged holes 11.

It will be understood that it is my purpose to arrange adjacent to the various holes, certain incomplete subject matter, which can be used for an educational device in the following manner:

The pupil may lay the sheet 10 on a blank sheet of paper 12.

Assuming that the incomplete subject matter adjacent to the various holes 11 of the sheet 10 constitutes a series of exercises in addition, then the pupil may perform the various calculations and write the answers through the holes on the underlying sheet 12.

In the illustration shown, where the exercises are exercises of addition, the columns of figures are arranged above the respective holes 11, and are indicated generally by the reference character A. For instance, as shown in Figure 1, I have indicated above and adjacent to the upper left-hand hole 11, the numerals "582" and "743" arranged in a column above the hole. Similar problems are arranged adjacent to the other holes.

When the various calculations have been made and the results written on the underlying sheet of blank paper 12, the pupil takes the sheet 11 and turns it over, as indicated by the arrow at the lower right-hand end, by simply lifting up the bottom and turning it over.

It will be understood that the holes are so arranged that by thus turning the sheet, the hole which was originally at the lower left-hand part of the sheet, will after the turn register with what was originally the position of the upper left-hand hole, so as to display through it the answer or result of the calculation or the completed subject matter, which has been written in the upper left-hand space.

Referring now to Figure 2, it will be noted that after the turn of the sheet, as explained, has been made, the results of the calculations that have been written on the underlying original blank sheet will be visible through the holes. Adjacent to the respective holes, I arrange subject matter B, to be used for checking the subject matter appearing through the holes.

Thus the pupil is enabled to check his answer or completed subject matter, which is shown through the holes, by what should be the corresponding subject matter, which is the true result of the calculation he has made or is the proper completing subject matter, standing adjacent to the hole through which his own calculation or subject matter appears.

It will be seen that on the reverse side of the sheet 10, as shown in Figure 2, I have shown adjacent to each of the holes 11, the necessary arrangement of characters to afford another problem in addition.

It will be understood that other incomplete subject matter could be used as will be hereinafter explained.

The characters or numerals for embodying the problems in addition shown on the reverse side of the sheet 10, as shown in Figure 2, are upside down, when the answers or incomplete subject matter B are rightside up.

After the problems on the first or obverse side of the sheet have been worked, and the sheet has been turned over in the manner already described and the answers checked, then the same sheet can be used for working an entirely new set of problems.

The pupil simply turns the sheet shown in Figure 2 by rotating it, without turning it over, through a half circle, whereupon the hole which before the rotation was at the lower right-hand corner will be at the upper left-hand corner of the sheet.

The problems in addition then clearly appearing rightside up to the pupil may be worked and the answers inserted through the holes on a new blank sheet or upon the reverse side of the original blank sheet.

After all of the problems have been thus worked, and the answers put down, the sheet is again turned over in the original manner, that is, by taking the bottom and lifting it up and forwardly away from the user and then laying the sheet down. The holes, which before such turn were at the bottom of the sheet, will now be at the top of the sheet, and through them will appear the results of the first calculations of the first row of problems.

It will thus be seen that I have provided a simple educational device, comprising a card, having in the illustration now under consideration on its obverse side a series of problems in addition arranged adjacent to a series of holes, and in the illustration shown above, below each hole are the figures representing the answer to another problem in addition found adjacent to a different hole on the reverse side of the sheet. On the reverse side are a series of problems arranged adjacent to the respective holes, and a series of answers for the problems on the obverse side.

On each side the characters representing a problem are rightside up and the characters representing matter for completing a problem found on the other side, are up side down so that the latter characters may interfere as little as may be with the attention of the student.

Each side of the sheet therefore has a series of problems and a series of answers for the problems on the other side.

The pupil can write the answer for each problem through the adjacent hole on a blank sheet of paper, and then by turning the sheet over, the holes and the answers on the other side are so arranged that the answers printed on the sheet appear adjacent to the holes through which the corresponding answers on the blank sheet are visible.

Then by rotating the sheet and shifting the blank sheet, the same series of operations can be repeated.

Figure 3:
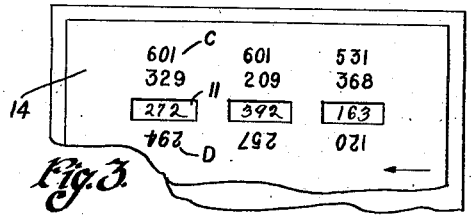
Figure 3 is a plan view of a portion of a card embodying a slightly different form of my invention.
Figure 4:
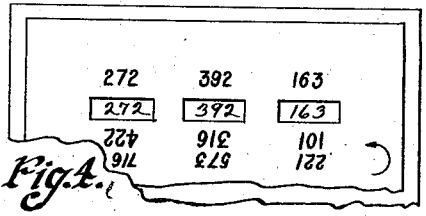
Figure 4 is a plan view of a portion of the reverse side of the card shown in Figure 3.

In Figures 3 and 4, I have illustrated a slightly modified form of my invention in which the incomplete subject matter on one side and the answers on the other side are so arranged that the sheet is turned like the leaves of a book, after the answers have been written through the holes, for causing the written answers on the sheet on the opposite side to be adjacent to the hole through which the answer written by the pupil appears.

The problems illustrated in Figures 3 and 4 are problems in subtraction.

The figures representing the problem on the obverse side of the sheet for instance are arranged right side up, and the figures representing the answers to the problems on the other side are wrong side up, this arrangement being similar to that of Figures 1 and 2.

In Figure 3, I have represented the sheet with the hole in it by the reference character 14, the holes by the reference character 11, the characters indicating the problem by the letter C, and the characters indicating the answers by the letter D.

Figure 5:
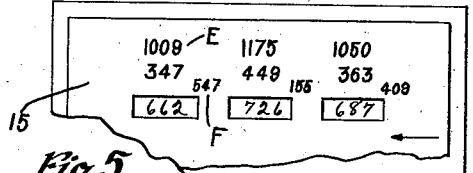
Figure 5 is a plan view of a portion of a card embodying a slightly different form of my invention.
Figure 6:
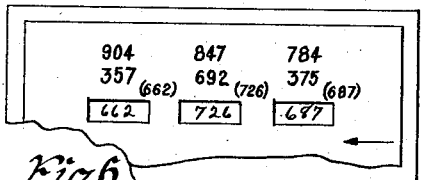
Figure 6 is a plan view of a portion of the reverse side of the card shown in Figure 5.

In Figures 5 and 6, I have shown a slightly different form of the main sheet, which is indicated by the character 15. The numerals employed in examples of subtraction are indicated by the reference letter E. The figure representing the answers are represented by the reference letter F and are arranged on the sheet, as shown, in such manner that the answers for the problems on the reverse side are arranged on the obverse side slightly above and to the right of the holes. This effects a saving of space and makes it possible to put more problems on a sheet.

The sheet illustrated in Figures 5 and 6 is to be turned the same as the sheet illustrated in Figures 3 and 4.

Figure 7:
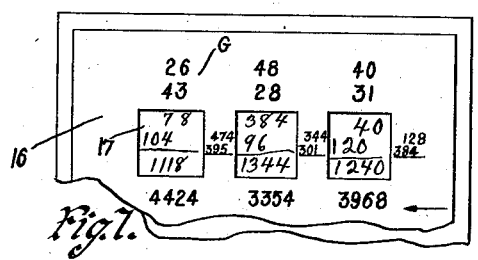
Figure 7 is a plan view of a portion of a card embodying a slightly different form of my invention and illustrating the steps involved in completing the exercise on the opposite side of the sheet.
Figure 8:
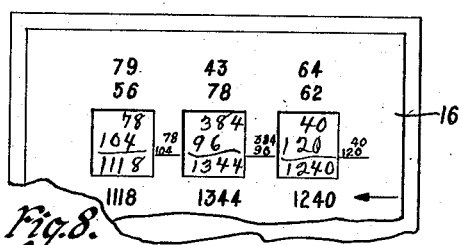
Figure 8 is a plan view of a portion of the reverse side of the card shown in Figure 7.

In Figures 7 and 8, I have shown the sheet 16 with the numerals G for embodying a problem in multiplication and with the holes 17 larger than the holes 11 of the sheets 10, 14 and 15.

In these sheets shown in Figures 7 and 8, the answers for the problems on the reverse side are arranged right side up on the obverse side just below the holes.

Figures 9, 10:
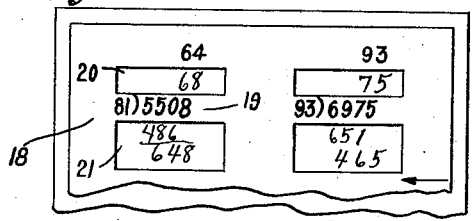
Figure 9 is a plan view of a card embodying still another form and slightly different form of my invention, partly broken away.
Figure 10 is a plan view of the reverse side of part of the card shown in Figure 9.

In Figures 9 and 10, I have shown the sheet 18 having the figures 19 comprising a problem in long division and have shown above and below each problem the holes 20 and 21 for the answers and for the figures of calculation. Here I also place adjacent to the proper holes the characters representing the steps in solving the problems.

I have shown the different forms in which my invention may be embodied for several reasons.

One of the important features of my invention lies in the arrangement of problems or of incomplete subject matter on both sides of the sheet, and the arrangement of answers or completed subject matter on both sides of the sheet. This effects great saving in the number of sheets employed, thus I cut the number of sheets ordinarily used in half. The pupil can work twice as many problems without changing sheets. The teacher need handle only half as many sheets and less storage room is necessary than when one side of a sheet is used for problems and the other side for completing subject matter.

I have shown that the principle thus involved may be used for various kinds of arithmetical calculations.

It will be obvious that the same plan might be used for various other educational problems.

I have shown that incomplete subject matter may be arranged up side down relative to the complete subject matter on each side of the sheet or can be arranged right side up with relation thereto.

The completed subject matter, which constitutes the answers of the mathematical problem may be located in different positions with relations to the holes.

The holes and the subject matter on the cards may be so relatively arranged as to permit the cards or sheets to be turned over in different ways, as may be most convenient.

The subject matter selected may constitute problems in addition, subtraction, multiplication or division or problems in English or other studies.

Particular attention may be called to the structure shown in Figures 9 and 10 in which there are two holes for each problem. This structure is adopted because of the character of problems in long division.

It will be seen from the foregoing that the essential features of my invention may be embodied in cards differing considerably in details of arrangement of holes and the subject matter on the cards.

I claim:

1. In an educational device, a sheet having a series of holes, arranged according to a plan, educational exercises in the form of incomplete subject matter, on each side of the sheet, adjacent to the respective holes, matter for rendering each exercise complete, arranged on the opposite side of the sheet from such exercise and adjacent to an appropriate hole.

2. In an educational device, a sheet having a series of holes arranged according to a plan, educational exercises in the form of incomplete subject matter on each side of the sheet, adjacent to the respective holes, matter for rendering each exercise complete, arranged on the opposite side of the sheet from such exercise and adjacent to an appropriate hole, the incomplete subject matter, and the completed subject matter adjacent to each hole, being upside down with relation to each other.

3. In a device of the class described, a sheet having on each side a series of sets of characters comprising mathematical problems, said sheet having a hole adjacent to each set through which a pupil may perform a calculation, and set down an answer on an underlying sheet, said sheet having adjacent to each "answer" hole, characters representing the answer or solution of a problem on the other side of the sheet, and the steps of the process followed in solving such problem.

4. In a device of the class described, a sheet having on each side a series of sets of characters comprising mathematical problems, said sheet having a hole adjacent to each set through which a pupil may perform a calculation, and set down an answer on an underlying sheet, said sheet having adjacent to each "answer" hole, characters representing the answer or solution of a problem on the other side of the sheet.

5. In an educational device, a sheet having a series of holes arranged according to a plan, a series of educational exercises comprising incomplete subject matter arranged on each side of the sheet with each exercise adjacent to a hole, the matter for rendering each exercise complete and showing the steps involved in completing it arranged on the opposite side of the sheet from such exercise and adjacent to appropriate holes, so that when the sheet is placed over a piece of paper and the completing subject matter written on the paper through the hole adjacent to each exercise, the sheet may then be turned over on the paper and so placed that the completing subject matter written on the paper will appear through the holes adjacent to the printed completing matter on the sheet in such close proximity as to insure convenience, speed and accuracy in checking.

JOHN W. STUDEBAKER.